Patented Mar. 11, 1930

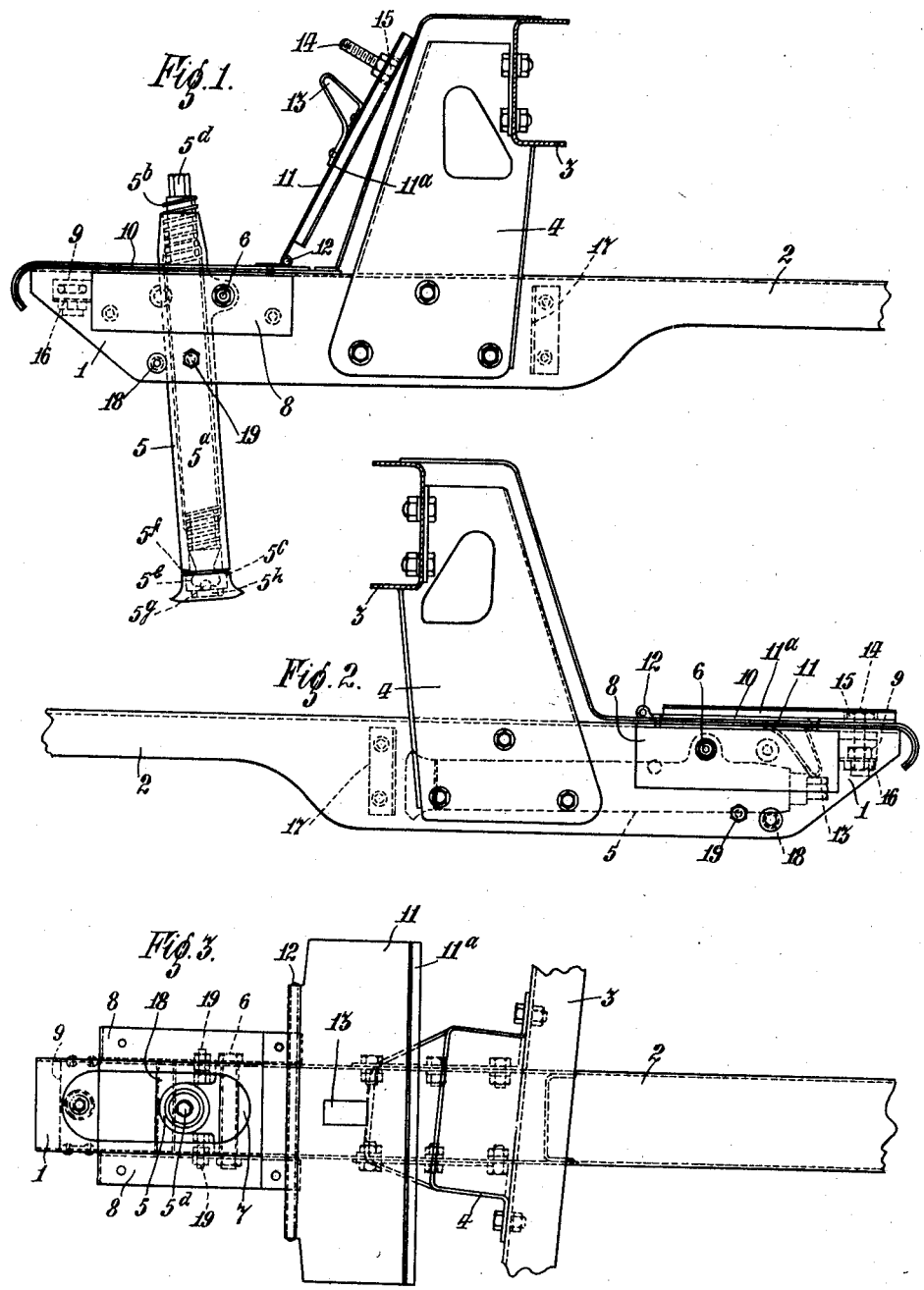

1,750,584

UNITED STATES PATENT OFFICE

WALTER ERNEST EVANS, OF WOLVERHAMPTON, ENGLAND

JACKING OF ROAD VEHICLES

Application filed October 10, 1928, Serial No. 311,691, and in Great Britain December 9, 1927.

My invention relates to improvements in the jacking of road vehicles, particularly motor vehicles.

The main object of my invention is to render it possible to jack-up one or other of the sides of a vehicle with greater facility than heretofore and without inconvenience in operating the jack.

I attain this object by providing the side members of the chassis frame of the vehicle with means projecting outwardly beyond the frame, such projecting means being suitable for application or attachment thereto of a jack by means of which the vehicle can be raised sidewise.

By way of example, my invention will now be described with reference to the accompanying drawings, in which:—

Fig. 1 is an elevation of the before-mentioned projecting means and parts associated therewith at one side of the chassis, the side member thereof being shown in section;

Fig. 2 is a corresponding view at the other side of the chassis, the parts however being shown in different positions;

Fig. 3 is a plan of Fig. 1.

In the form of the invention shown, the projecting means intended to act as abutments for the lifting-jacks are indicated at 1, 1 and constitute extensions of a transverse channel girder 2 which is braced rigidly to girders 3, 3, constituting the side members of the chassis frame, by means of brackets 4, 4. In practice, the beam 2 would be located in the vertical transverse plane containing the centre of weight of the vehicle, or would be located as close thereto as should be convenient.

The numerals 5, 5 denote screw jacks which are pivoted by means of bolts 6, 6 to the extensions 1.

The jack 5 shown in Fig. 1 occupies its operative position, in which it passes through a slot 7 (see Fig. 3) in the extension 1, while the jack 5 shown in Fig. 2 occupies its inoperative position, in which it is stowed snugly beneath the extension 1 within the channel thereof.

As shown, each extension 1 is reinforced in the way of the slot 7 by external angle pieces 8, 8 and by an internal channel piece 9.

Light plates 10, 10 extend along both sides of the chassis and form parts of the usual running-boards, these plates having slots which register with the slots 7. The plates 10, 10 are supported at their ends by the usual running-board brackets (not shown) but are also supported by the extensions 1, which therefore act as supports for the running-boards. Immediately above each slot 7, a flap 11 is hinged, this flap carrying a step-mat 11ª forming in effect a part of the running-board. The hinge is indicated at 12. Each flap 11 carries on its lower side a projection 13 and a screw 14 (not shown in Fig. 3 for clearness), which screw is swivel-mounted on the flap and the head of which is sunk within a recess 15 in the step-mat 11ª, the functions of the parts 13 and 14 being as follows. When the flap 11 is lowered from its operative position (Fig. 1) into its inoperative position (Fig. 2), the projection 13 passes through the slot 7 and engages with the top of the relative jack 5; this causes the jack to pivot into its inoperative position. At the same time, the screw 14 also passes through the slot 7 and moves into a position wherein it can be engaged by a nut 16 which is mounted in the relative channel piece 9. By screwing the nut 16 on the end of the screw 14, the flap 11 can be secured to the extension 1 and the jack thus maintained rigidly in its inoperative position.

The jacks shown each comprise a sleeve 5ª held against rotation about its axis by the bolt 6, a screw-threaded pillar 5ᵇ in screw-threaded engagement with the sleeve at the bottom end thereof, and a foot 5ᶜ attached to the pillar. The head of the pillar consists of a polygonal projection 5ᵈ which can be engaged by a tool having a counter-part socket, by means of which tool the pillar can be screwed down into the sleeve and the jack thus extended. The tool might have a hand-wheel for turning it or might comprise a ratchet device. The attachment between the pillar 5ᵇ and foot 5ᶜ consists of a bulb 5ᵉ, formed on the adjacent end of the pillar, and a retaining ring 5ᶠ embracing the pillar above the bulb and secured to the foot. In addition, the bulb 5ᵉ has a cavity which, when the jack is in use, bears upon a hardened steel ball 5ᵍ, the latter being seated in a foot-step 5ʰ fitted within the foot $5^c$. With this arrangement, a one-point support is provided for the jack, which support will permit the pillar $5^b$ to be turned freely when being screwed through the sleeve $5^a$ and will also permit the foot to accommodate itself to uneven surfaces on the road without affecting the effectiveness of the jack.

The numerals 17, 17 denote stops which prevent the pillars $5^b$ from becoming unscrewed by vibration when the jacks are stowed and the vehicle is in motion. The numerals 18, 18 denote pins, each of which acts as a limit stop for the relative jack at each end of its range of pivotal movement. The numerals 19, 19 denote adjustable pins which serve as guides for the jack during its pivotal movement and so prevent sidewise movement thereof.

When it is desired to jack-up one side of the vehicle, the nut 16 at that side is unscrewed, and, when the screw 14 is disengaged, the flap 11 is raised into the position shown in Fig. 1. Simultaneously with the raising of the flap 11, the jack 5 pivots into its operative position. The projection $5^d$ is then turned by the appropriate tool until the foot $5^c$ rests on the ground. By continuing the turning of the projection $5^d$, the side of the vehicle is raised. In order to lower the vehicle and stow the jack into the Fig. 2 position, the above procedure is reversed.

The extensions 1 and the brackets 4 by which they are braced are designed to withstand distortion when raised by the jacks, that is, when submitted to upward pressures as distinct from the downward pressures which the usual running-board brackets are designed to sustain. The parts 1 and 2 have been shown as a simple girder, but of course might be a compound girder.

The construction shown has been shown simply by way of example and obvious modifications may be made without departing from the scope of the invention. For instance, a single jack might be provided and might be changeable at will from one side of the vehicle to the other; that is, the jack might not be permanently attached to the projecting means, but might be detachable or even quite loose.

It will be apparent that, by providing projecting means in accordance with this invention, the jack whether attached or loose will, when in use, be in an extremely accessible position and will be capable of being operated without inconvenience.

I claim:—

1. In a road vehicle, a chassis frame including a side member, a running board adjacent said side member, an opening in said running board, means on said side member projecting outwardly beyond said frame, and jacking means on said projecting means adapted to be swung into an operative position in which it is accessible at said opening and into an inoperative position in which it is stowed in a substantially horizontal position.

2. In a road vehicle, a chassis frame including side members, running boards adjacent said side members, openings in said running boards, a transverse girder secured to said side members, said transverse girder projecting outwardly beyond said frame and supporting said running board, and pivotal jacking means at the ends of said girder adapted to be swung into an operative position in which it is accessible at said openings and into an inoperative position in which it is stowed in a substantially horizontal position.

3. In a road vehicle, a chassis frame including a side member, a running board adjacent said side member, an opening in said running board, a member hinged on said running board in the way of said opening, means on said side member projecting outwardly beyond said frame, and jacking means on said projecting means controlled by said hinged member and adapted to be swung into an operative position in which it is accessible at said opening and into an inoperative position in which it is stowed in a substantially horizontal position.

4. In a road vehicle, a chassis frame including side members, running boards adjacent said side members, opening in said running boards, flaps hinged on said running boards in the way of said openings, a transverse girder secured to said side members, said transverse girder projecting outwardly beyond said frame and supporting said running boards, and pivotal jacking means at the ends of said girder adapted to be swung by said flaps into an operative position in which they are accessible at said openings and into an inoperative position in which they are stowed in a substantially horizontal position.

In testimony whereof I affix my signature.

WALTER ERNEST EVANS.